[12] United States Patent
Kwak et al.

(10) Patent No.: US 7,483,475 B2
(45) Date of Patent: *Jan. 27, 2009

(54) EFFICIENT JOINT DETECTION

(75) Inventors: Jaeyoung Kwak, Morganville, NJ (US);
John W. Haim, Baldwin, NY (US);
Ariela Zeira, Huntington, NY (US);
Jung-Lin Pan, Selden, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/926,534

(22) Filed: Oct. 29, 2007

(65) Prior Publication Data

US 2008/0062860 A1   Mar. 13, 2008

Related U.S. Application Data

(63) Continuation of application No. 10/644,361, filed on Aug. 20, 2003, now Pat. No. 7,289,552.

(60) Provisional application No. 60/404,561, filed on Aug. 20, 2002.

(51) Int. Cl.
*H04B 1/00* (2006.01)

(52) U.S. Cl. ...................................... 375/147

(58) Field of Classification Search ................ 375/130, 375/140, 147, 150, 316, 343, 340, 346, 347, 375/348, 229–236; 370/320, 335, 342, 441; 708/403, 402, 400, 404, 405, 821, 820
See application file for complete search history.

(56) References Cited

U.S. PATENT DOCUMENTS 6,144,711 A   11/2000   Raleigh et al.
(Continued)

FOREIGN PATENT DOCUMENTS

WO   99/40698   8/1999

(Continued)

OTHER PUBLICATIONS

Klein et al., "Zero Forcing and Minimum Mean-Square-Error Equalization for Multiuser Detection in Code-Division Multiple-Access Channels," IEEE Transactions on Vehicular Technology, vol. 45, No. 2, May 1996.

(Continued)

*Primary Examiner*—Mohammad H Ghayour
*Assistant Examiner*—Vineeta S Panwalkar
(74) *Attorney, Agent, or Firm*—Volpe and Koenig, P.C.

(57) ABSTRACT

K data signals, or bursts, are transmitted over a shared spectrum in a code division multiple access communication format. A combined signal is received and sampled over the shared spectrum, as a plurality of received vector versions. The combined signal includes the K transmitted data signals. A plurality of system matrices and an associated covariance matrix using codes and estimated impulse responses of the K data signals is produced. Each system matrix corresponds to a received vector version. The system and covariance matrices are extended and approximated as block circulant matrices. A diagonal matrix of each of the; extended and approximated system and covariance matrices are determined by prime factor algorithm—fast Fourier transform (PFA-FFT) without division of the matrix. The received vector versions are extended. A product of the diagonal matrices and the extended received vector versions is taken. An inverse block discrete Fourier transform is performed by a PFA-FFT on a result of the product to produce the estimated data of the K data signals.

20 Claims, 8 Drawing Sheets

U.S. PATENT DOCUMENTS

Figure 1:
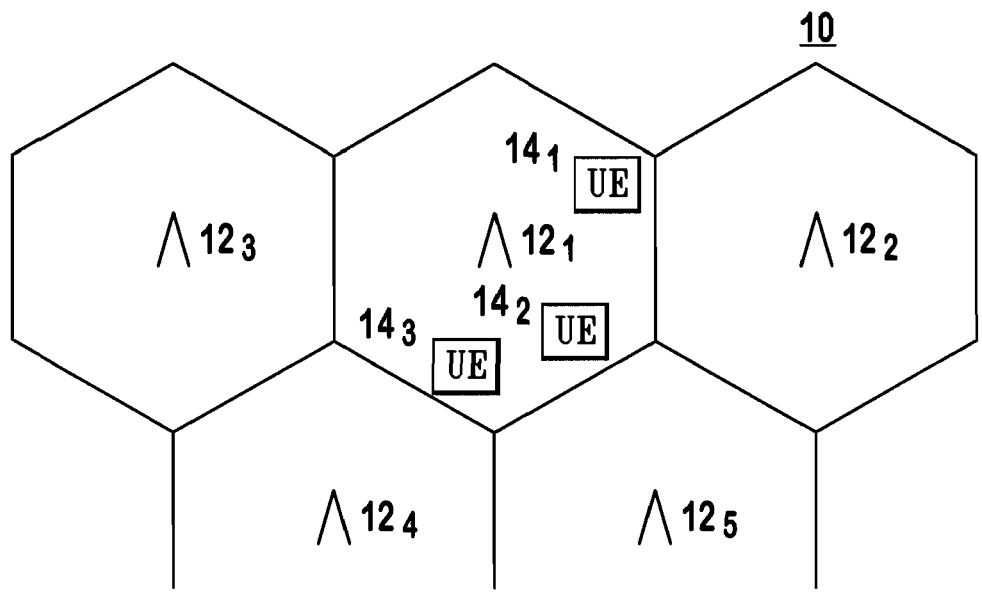

| | | |
|---|---|---|
| 6,208,295 B1 | 3/2001 | Dogan et al. |
| 6,252,540 B1 | 6/2001 | Hale et al. |
| 6,370,129 B1 | 4/2002 | Huang |
| 6,424,596 B1 | 7/2002 | Donald |
| 6,625,203 B2 | 9/2003 | De et al. |
| 6,952,460 B1 | 10/2005 | Van Wechel et al. |
| 2002/0146078 A1 | 10/2002 | Gorokhov et al. |
| 2003/0021335 A1 | 1/2003 | De et al. |
| 2003/0026325 A1 | 2/2003 | De et al. |

FOREIGN PATENT DOCUMENTS

| | | |
|---|---|---|
| WO | 02/13266 | 4/2002 |
| WO | 02/089346 | 11/2002 |

OTHER PUBLICATIONS

Klein, "Data Detection Algorithms Specially Designed for the Downlink of CDMA Mobile Radio Systems," IEEE 47th Vehicular Technology Conference, Phoenix, AZ, USA, May 4-7, 1997.

Karimi et al., "A Novel and Efficient Solution to Block-Based Joint-Detection Using Approximate Cholesky Factorization," Motorola GSM Products Division, Swindon, UK, 1998.

PA Consulting Group/Racal Instruments Ltd., "Low Cost MMSE-BLE-SD Algorithm for UTRA TDD Mode Downlink," ETSI STC SMG2 Layer 1 Expert Group, Helsinki, Finland, Sep. 8-11, 1998.

Klein et al., "Linear Unbiased Data Estimation in Mobile Radio Systems Applying CDMA," IEEE Journal on Selected Areas in Communications, vol. 11, No. 7, Sep. 1993.

Benventuto et al., "Joint Detection With Low Computational Complexity For Hybrid TD-CDMA Systems", Vehicular Technology Conference, 1999, VTC IEEE VTS 50th, Amsterdam, The Netherlands, Sep. 1999.

Das et al., Computationally Efficient Multiuser Detectors, *Personal, Indoor and Modile Radio Communications, 1997*, The 8th Annual IEEE International Symposium on Helsinki, Finland, Sep. 1997.

Lee et al., "A Fast Computation Algorithm For The Decision Feedback Equalizer", IEEE Transactions On Communications, vol. 43, No. 11, Nov. 1999.

Vollmer et al., "Comparative Study of Joint-Detection Techniques for TD-CDMA Based Mobile Radio Systems", IEEE Journal on Selected Areas in Communications, IEEE, vol. 19, No. 8, Aug. 2001, pp. 1461-1475.

Pan et al., "Low Complexity Data Detection Using Fast Fourier Transform Decomposition of Channel Correlation Matrix", 2001 IEEE Global Telecommunications Conference, vol. 2 of 6, Nov. 2001, pp. 1322-1326.

3G TS 25.221 V3.2.0, 2000-03, "Ultra (TDD) physical channels and mapping of transport channels onto physical channels," 3rd Generation Partnership Project, Technical Specification Group RAN WG1. (www.3gpp.org).

3G TS 25.211 V4.0.0, 2001-03, "Ultra (TDD) Physical Channels And Mapping Of Transport Channels Onto Physical Channels", 3rd Generation Partnership Project, Technical Specification Group RAN WG1. (www.3gpp.org).

3G TS 25.221 V4.2.0, 2001-09, "Ultra (TDD) Physical Channels And Mapping Of Transport Channels Onto Physical Channels", 3rd Generation Partnership Project, Technical Specification Group Ran WG1. (www.3gpp.org).

J. Blanz, A. Klein, M. NaBhan, and A.Steil, "Performance of a cellular hybrid C/TDMA mobile radio system applying joint detection and coherent receiver antenna diversity," IEEE. J. Select.Areas Commun., vol. 12, pp. 568-579, May 1994.

G.K. Kaleh, "Channel equalization for block transmission systems," IEEE J. Select. Areas Commun., vol. 13, pp. 110-120, Jan. 1995.

P. Jung and J. Blanz, "Joint detection with coherent receiver antenna diversity in CDMA mobile radio systems," IEEE Trans. Veh. Technol., vol. 44, pp. 76-88, Feb. 1995.

Benvenuto et al., "Joint detection with low computational complexity for hybrid TD-CDMA systems," IEEE J. Select. Areas Commun., vol. 19, pp. 245-253, Jan. 2001.

M. Vollmer, "Programs for computing computational requirements of four JD algorithms," http://www-dt-e-technik.unidortmund.de/mitarbeiter/mvo/compreq.html.

EFFICIENT JOINT DETECTION

CROSS REFERENCE TO THE RELATED APPLICATION(S)

This application is a continuation of U.S. patent application Ser. No. 10/644,361 filed Aug. 20, 2003 which claims the benefit of U.S. Provisional Application No. 60/404,561, filed Aug. 20, 2002.

BACKGROUND

FIG. 1 is an illustration of a wireless communication system 10. The communication system 10 has base stations $12_1$ to $12_5$ (12) which communicate with user equipments (UEs) $14_1$ to $14_3$ (14). Each base station 12 has an associated operational area, where it communicates with UEs 14 in its operational area.

In some communication systems, such as frequency division duplex using code division multiple access (FDD/CDMA) and time division duplex using code division multiple access (TDD/CDMA), multiple communications are sent over the same frequency spectrum. These communications are differentiated by their channelization codes. To more efficiently use the frequency spectrum, TDD/CDMA communication systems use repeating frames divided into timeslots for communication. A communication sent in such a system will have one or multiple associated codes and timeslots assigned to it.

Since multiple communications may be sent in the same frequency spectrum and at the same time, a receiver in such a system must distinguish between the multiple communications. One approach to detecting such signals is multiuser detection (MUD). In MUD, signals associated with all the UEs 14, are detected simultaneously. For TDD/CDMA systems, one of the popular MUD techniques is a joint detection technique using block linear equalizer (BLE-JD). Techniques for implementing BLE-JD include using a Cholesky or an approximate Cholesky decomposition. These approaches have high complexity. The high complexity leads to increased power consumption, which at the UE 14 results in reduced battery life.

Accordingly, it is desirable to have computationally efficient approaches to detecting received data.

SUMMARY

K data signals, or bursts, are transmitted over a shared spectrum in a code division multiple access communication format. A combined signal is received and sampled over the shared spectrum, as a plurality of received vector versions. The combined signal includes the K transmitted data signals. A plurality of system matrices and an associated covariance matrix using codes and estimated impulse responses of the K data signals is produced. Each system matrix corresponds to a received vector version. The system and covariance matrices are extended and approximated as block circulant matrices. A diagonal matrix of each of the extended and approximated system and covariance matrices are determined by prime factor algorithm— fast Fourier transform (PFA-FFT) without division of the matrices. The received vector versions are extended. A product of the diagonal matrices and the extended received vector versions is taken. An inverse block discrete Fourier transform is performed by a PFA-FFT on a result of the product to produce the estimated data of the K data signals.

BRIEF DESCRIPTION OF THE DRAWING(S)

Figure 3:
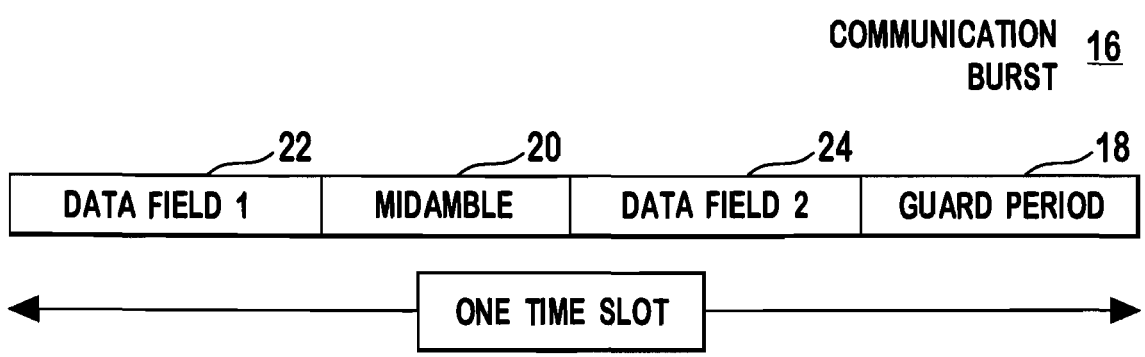
Figure 2:
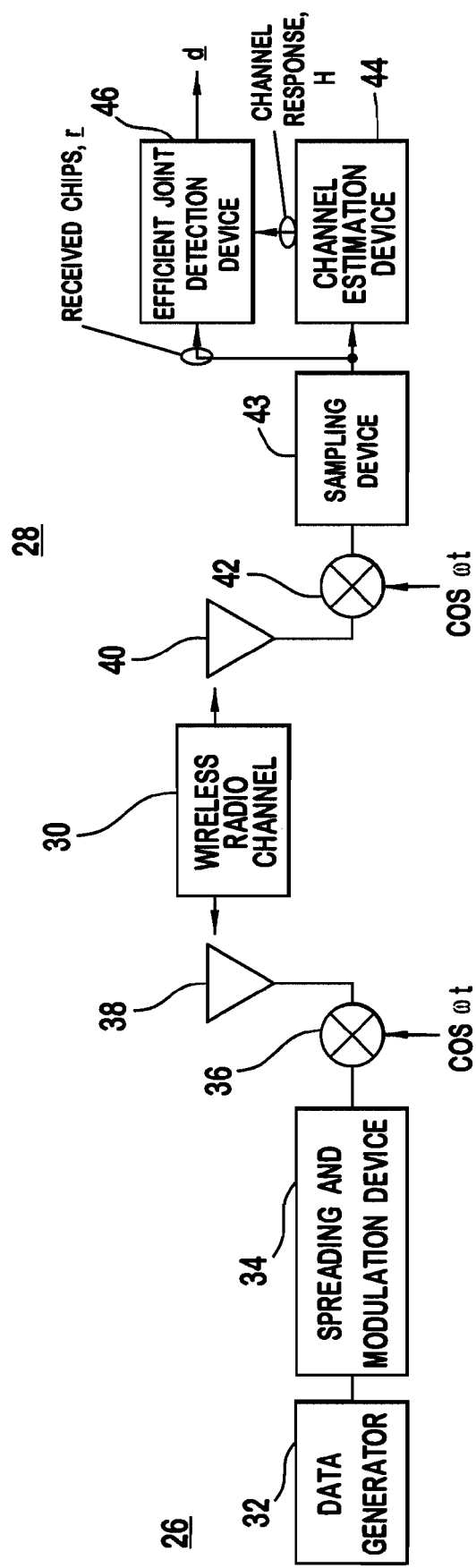
Figure 4A:
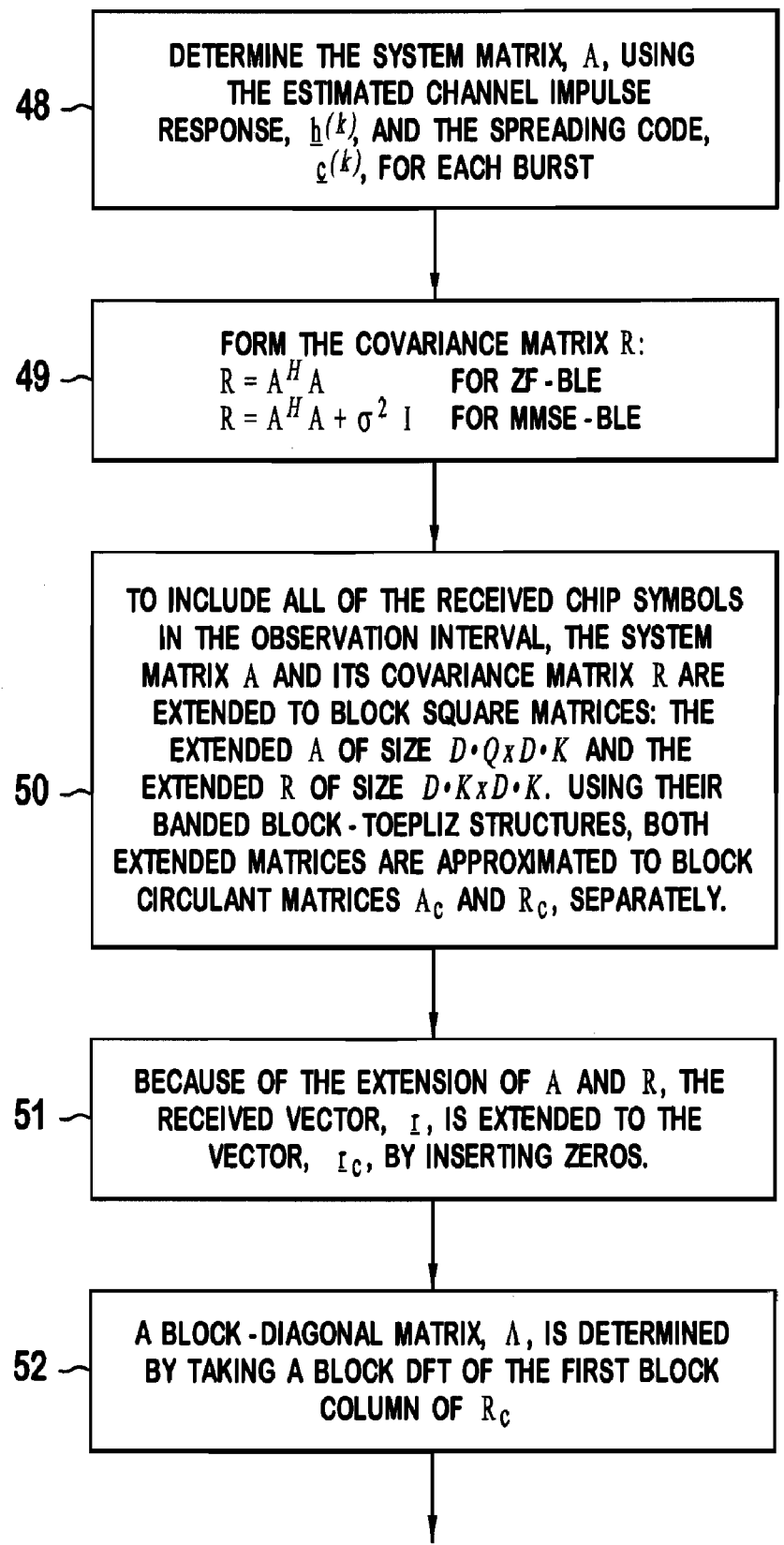
Figure 4B:
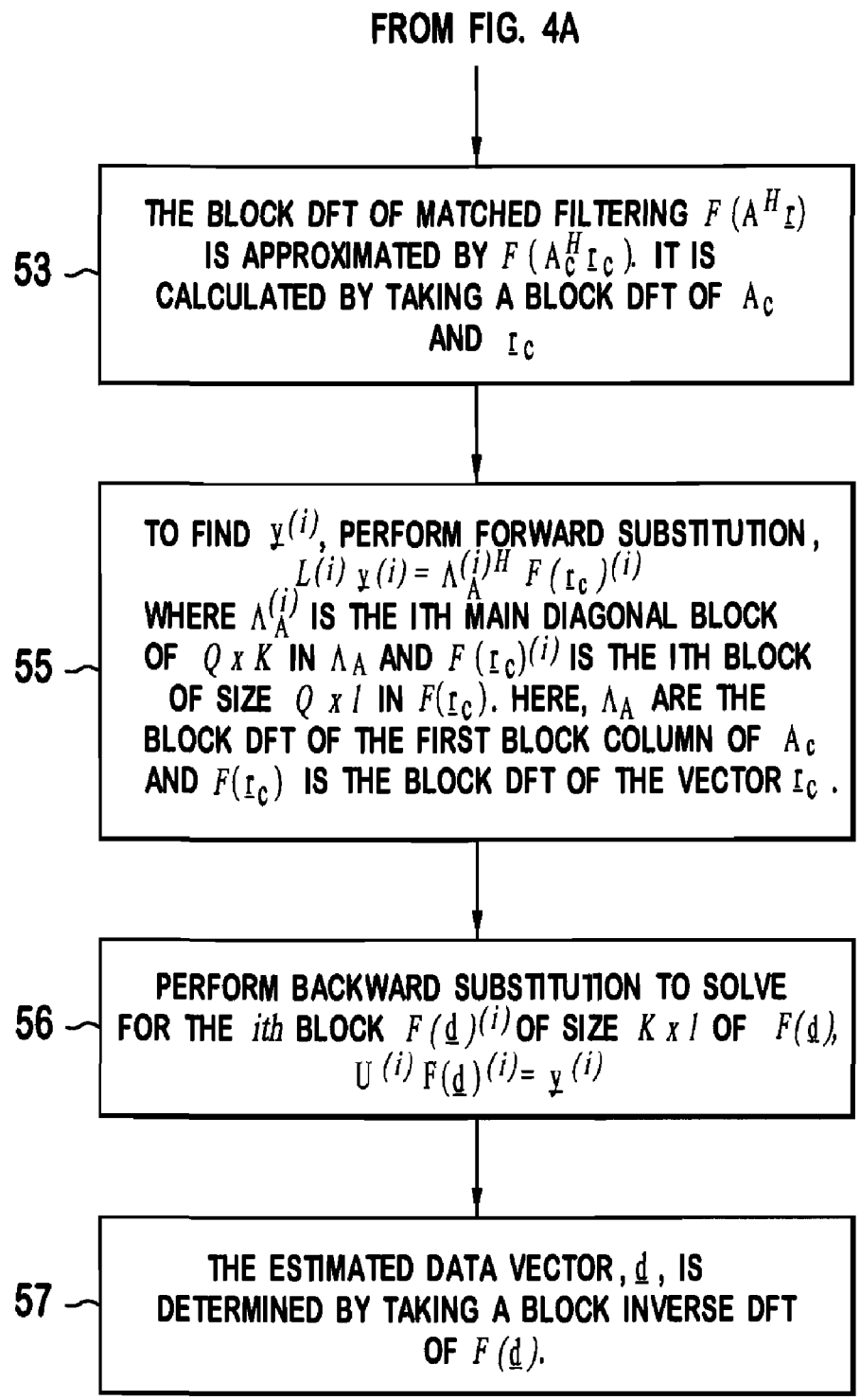
Figure 5:
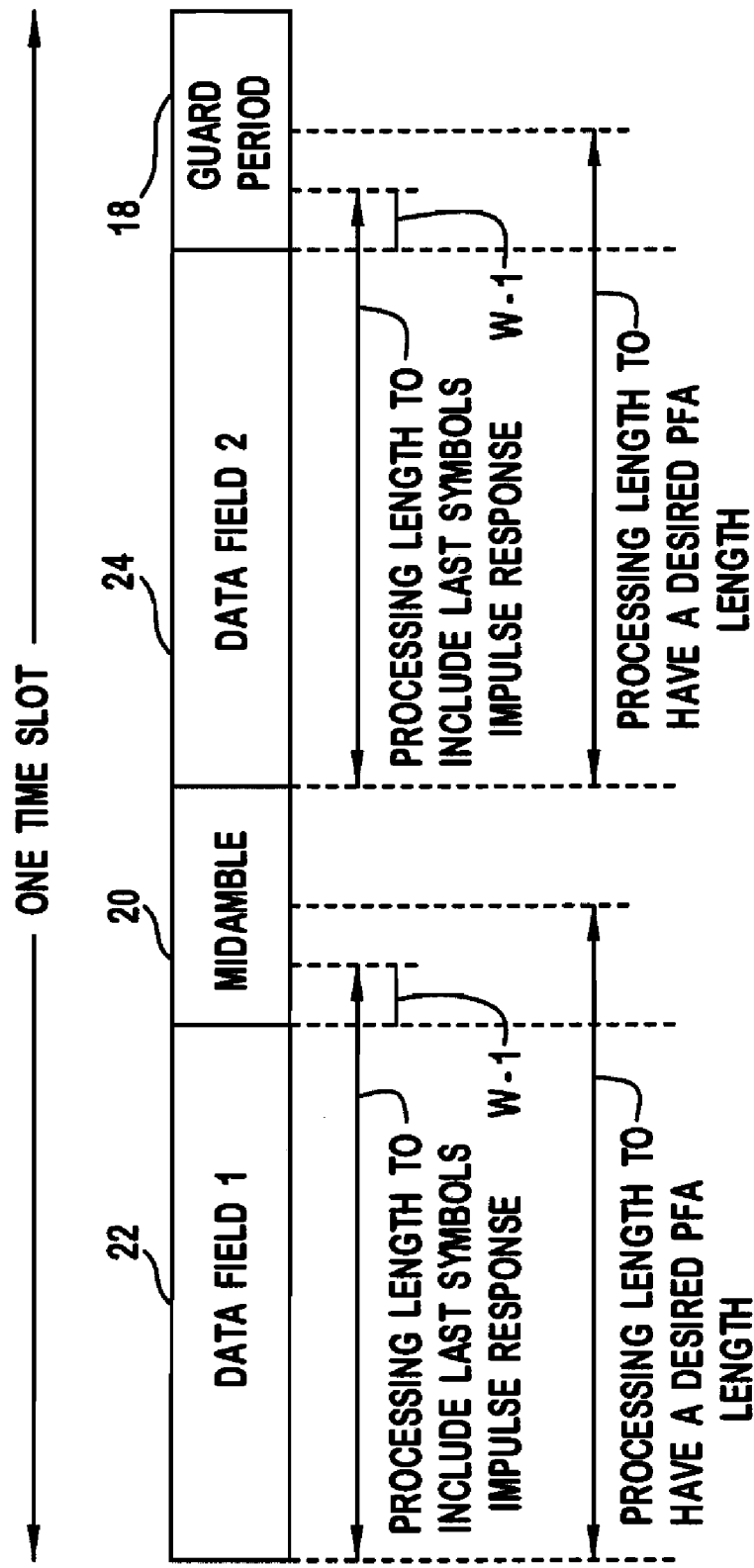
Figure 6:
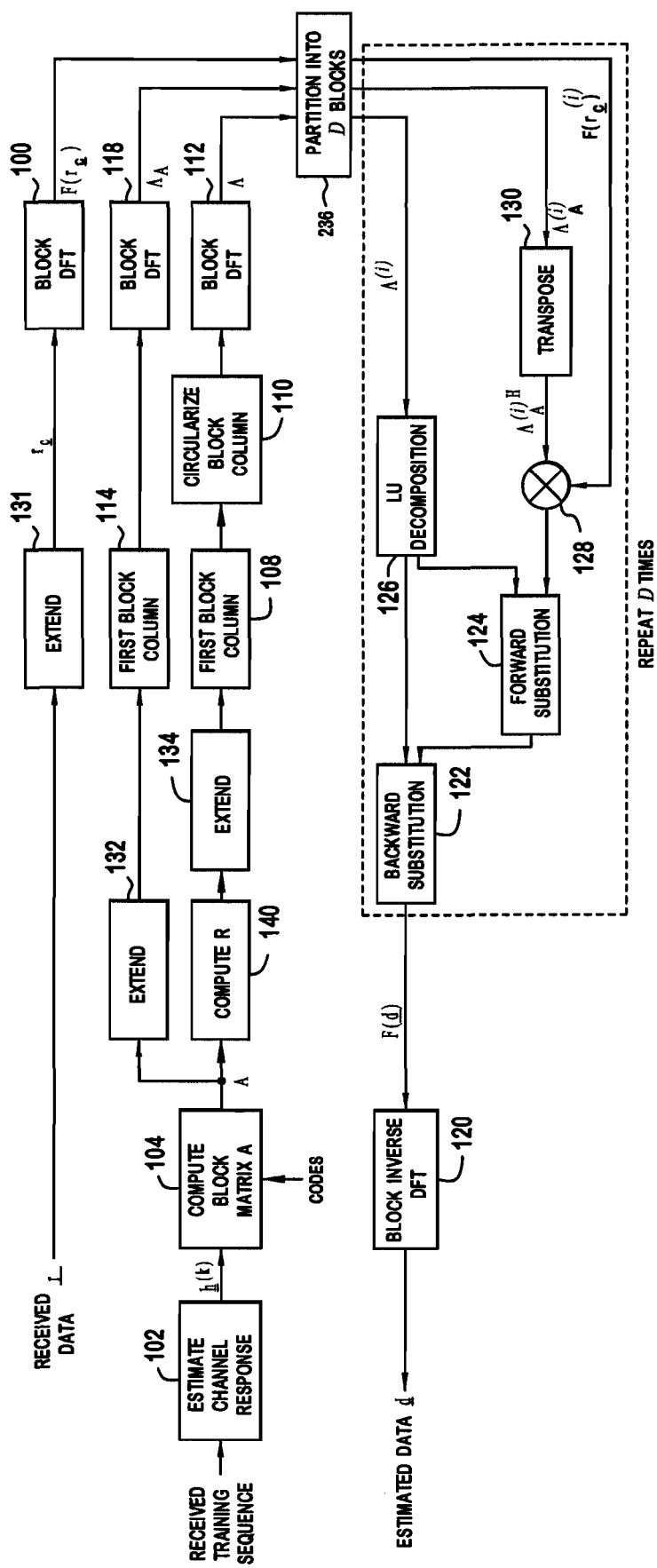
Figure 7:
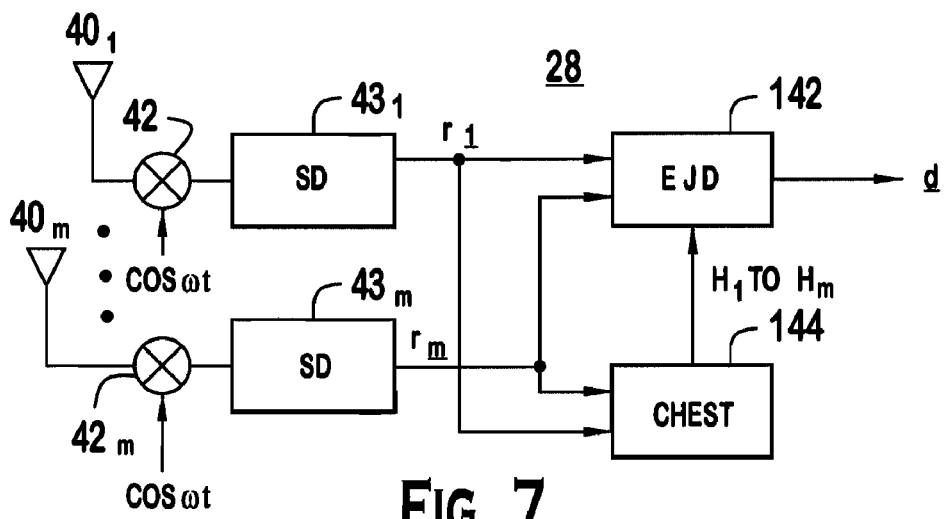
Figure 8:
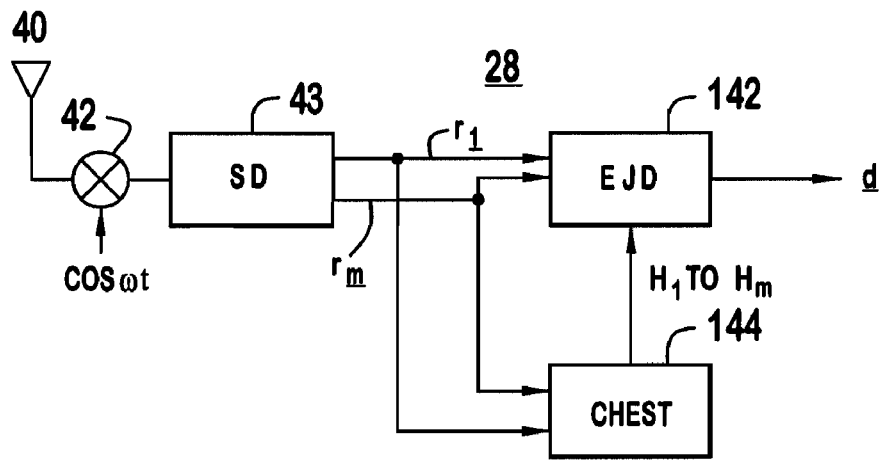
Figure 9:
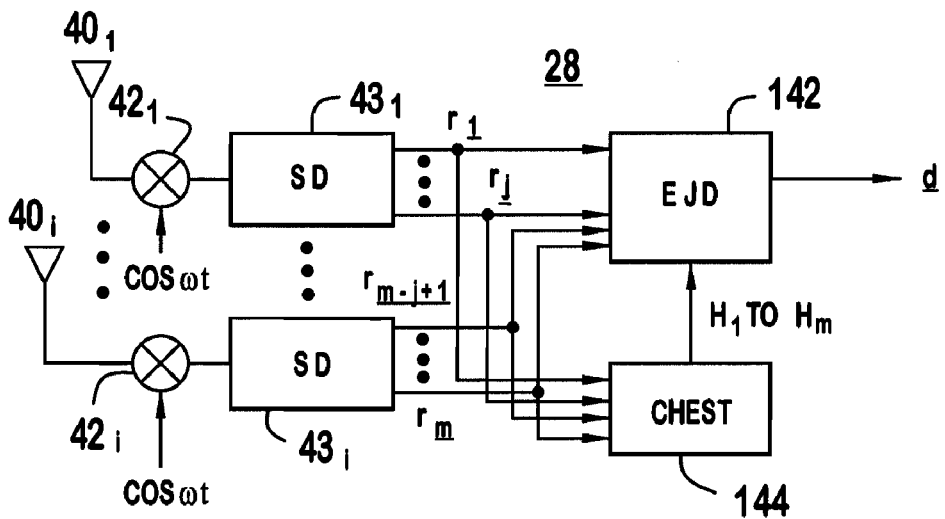
Figure 10:
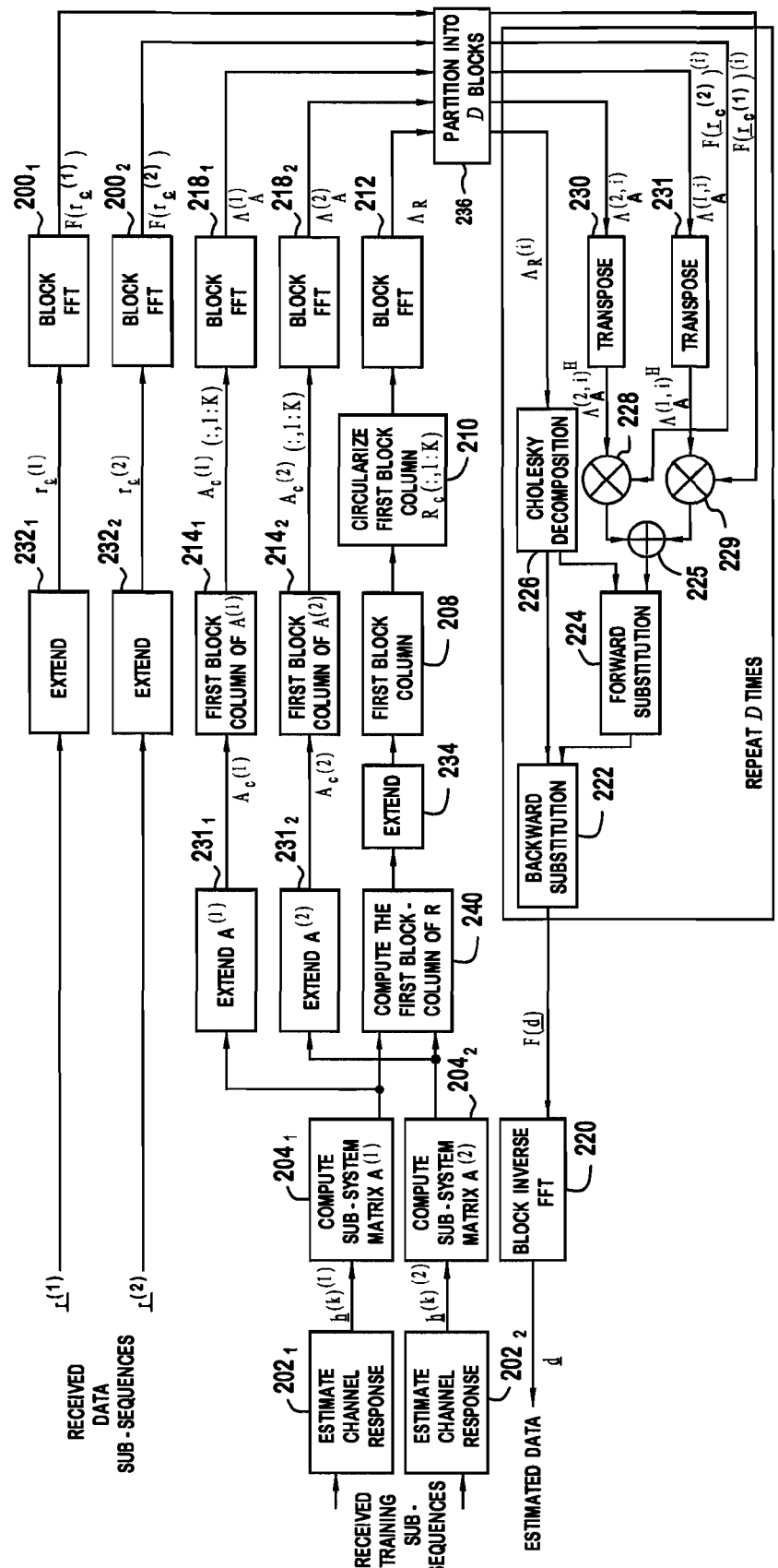

FIG. 1 is a wireless communication system.
FIG. 2 is a simplified transmitter and an efficient joint detection receiver.
FIG. 3 is an illustration of a communication burst.
FIGS. 4a and 4b are a flow chart of a preferred embodiment for efficient joint detection.
FIG. 5 is an illustration of a data burst indicating extended processing areas.
FIG. 6 is a block diagram of a preferred implementation of efficient joint detection.
FIG. 7 is a simplified receiver having multiple antennas.
FIG. 8 is a simplified receiver sampling the received signal using fractional sampling.
FIG. 9 is a simplified receiver having multiple antennas and using fractional sampling.
FIG. 10 is a block diagram of a preferred implementation of efficient joint detection for fractional sampling or receive diversity.

DETAILED DESCRIPTION OF THE PREFERRED EMBODIMENT(S)

FIG. 2 illustrates a simplified transmitter 26 and receiver 28 using efficient joint detection in a TDD/CDMA communication system, although efficient joint detection is applicable to other systems, such as FDD/CDMA. In a typical system, a transmitter 26 is in each UE 14 and multiple transmitting circuits 26 sending multiple communications are in each base station 12. The joint detection receiver 28 may be at a base station 12, UEs 14 or both.

The transmitter 26 sends data over a wireless radio channel 30. A data generator 32 in the transmitter 26 generates data to be communicated to the receiver 28. A modulation/spreading/training sequence insertion device 34 spreads the data with the appropriate code(s) and makes the spread reference data time-multiplexed with a midamble training sequence in the appropriate assigned time slot, producing a communication burst or bursts.

A typical communication burst 16 has a midamble 20, a guard period 18 and two data fields 22, 24, as shown in FIG. 3. The midamble 20 separates the two data fields 22, 24 and the guard period 18 separates the communication bursts to allow for the difference in arrival times of bursts transmitted from different transmitters 26. The two data fields 22, 24 contain the communication burst's data.

The communication burst(s) are modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as quadrature phase shift keying (QPSK) or M-ary quadrature amplitude modulation (QAM).

The antenna 40 of the receiver 28 receives various radio frequency signals. The received signals are demodulated by a demodulator 42 to produce a baseband signal. The baseband signal is sampled by a sampling device 43, such as one or multiple analog to digital converters, at the chip rate of the transmitted bursts. The samples are processed, such as by a channel estimation device 44 and an efficient joint detection device 46, in the time slot and with the appropriate codes assigned to the received bursts. The channel estimation device 44 uses the midamble training sequence component in the baseband samples to provide channel information, such as channel impulse responses. The channel information is used by the efficient joint detection device 46 to estimate the transmitted data of the received communication bursts as soft symbols.

The efficient joint detection device 46 uses the channel information provided by the channel estimation device 44 and the known spreading codes used by the transmitter 26 to estimate the data of the desired received communication burst(s).

Although efficient joint detection is explained using the third generation partnership project (3GPP) universal terrestrial radio access (UTRA) TDD system as the underlying communication system, it is applicable to other systems. That system is a direct sequence wideband CDMA (W-CDMA) system, where the uplink and downlink transmissions are confined to mutually exclusive timeslots.

The receiver 28 receives a total of K bursts that arrive simultaneously, within one observation interval. For the 3GPP UTRA TDD system, each data field of a time slot corresponds to one observation interval. For a frequency division duplex (FDD) CDMA system, the received signals are continuous, i.e., not in bursts. To handle the continuous signals, FDD systems divide the received signals into time segments prior to applying efficient joint detection.

A code used for a $k^{th}$ burst is represented as $c^{(k)}$. The K bursts may originate from K different transmitters or for multi-code transmissions, less than K different transmitters.

Each data field of a communication burst has a predetermined number of transmitted symbols, Ns. Each symbol is transmitted using a predetermined number of chips, which is the spreading factor, Q. Accordingly, each data field has Ns×Q chips. After passing through the wireless radio channel, which can introduce a delay spread of up to W−1 chips, the observation interval at the receiver is of length Q×Ns+W−1 chips.

The symbol response vector $b^{(k)}$ as the convolution of the channel response vector $h^{(k)}$ with the corresponding spreading code $c^{(k)}$ is per Equation 1.

$$b^{(k)} = h^{(k)} \circ c^{(k)} \quad \text{Equation 1}$$

∘ denotes the convolutional operator. The length of $b^{(k)}$ is SF+W−1.

Using the symbol response vectors, the system matrix A is defined as per Equation 2.

$$A = \begin{bmatrix} B & & & \\ & B & & \\ & & B & \\ & & & \ddots \\ & & & & B \end{bmatrix} \quad \text{Equation 2}$$

The size of the matrix is $(N_s \cdot SF+W-1) \times N_s \cdot K$. A is a block Toeplitz matrix.

Block B is defined as per Equation 3.

$$B = [b^{(1)} \, b^{(2)} \ldots b^{(K)}] \quad \text{Equation 3}$$

The received vector sampled at the chip rate can be represented by Equation 4.

$$r = Ad + n \quad \text{Equation 4}$$

The size of vector r is $(N_s \cdot SF+W-1)$ by 1. This size corresponds to the observation interval.

Data vector d of size $N_s \cdot K$ by 1 has the form of Equation 5.

$$d = [d_1^T \, d_2^T \ldots d_{N_s}^T]^T \quad \text{Equation 5}$$

The sub-vector $d_n$ of size K by 1 is composed of the $n^{th}$ symbol of each user and is defined as Equation 6.

$$d_n = [d_n^{(1)} \, d_n^{(2)} \ldots d_n^{(K)}]^T, \, n=1, \ldots, N_s \quad \text{Equation 6}$$

The vector n of size $(N_s \cdot SF+W-1)$ by 1 is the background noise vector and is assumed to be white.

Determining d using an MMSE solution is per Equation 7.

$$d = R^{-1}(A^H r) \quad \text{Equation 7}$$

$(\cdot)^H$ represents the Hermetian function (complex conjugate transpose). The covariance matrix of the system matrix R for a preferred MMSE solution is per Equation 8.

$$R = A^H A + \sigma^2 I \quad \text{Equation 8}$$

$\sigma^2$ is the noise variance, typically obtained from the channel estimation device 44, and I is the identity matrix.

Using block circulant approximation and block DFT using PFA-FFTs, d in Equation 7 can be determined per Equation 9.

$$\underline{d} = F(R^{-1})F(A^H \underline{r}) \quad \text{Equation 9}$$
$$= F^{-1}(\Lambda^{-1} \Lambda_A F(\underline{r}_c))$$

$F(\cdot)$ and $F^{-1}(\cdot)$ indicate the block-DFT function and the inverse block-DFT, respectively. The derivation of the block diagonal matrices $\Lambda$ and $\Lambda_A$ is described subsequently. Instead of directly solving Equation 9, Equation 9 can be solved using the LU decomposition and the forward and backward substitution of the main diagonal block of $\Lambda$. Alternately, Equation 9 can be solved using Cholesky decomposition.

FIG. 4 is a flowchart for a preferred method of determining the data vector d using fast joint detection. The system matrix A is determined using the estimated channel response vector $h^{(k)}$ and the spreading code $c^{(k)}$ for each burst, 48. R, the covariance matrix of the system matrix, is formed, 49. The system matrix A and its covariance matrix R are extended block square matrices. The extended A is of size D·Q by D·K and the extended R is of size D·K by D·K, respectively. D is chosen as per Equation 10.

$$D \geq \left\lceil N_s + \frac{W-1}{Q} \right\rceil \quad \text{Equation 10}$$

Both extended matrices are approximated to block circulant matrices, $A_c$ and $R_c$, 50. Because of the extension of A and R, the received vector, r, is extended to the vector $r_c$ of size D·SF×1 by inserting zeros, 51. The block-diagonal matrix, $\Lambda$, is determined by taking a block DFT using PFA-FFT of the first block column of $R_c$, 52.

The block DFT of matched filtering $F(A^H r)$ is approximated by $F(A_c^H r_c)$. It is calculated by taking a block DFT using PFA-FFT of $A_c$ and $r_c$, 53. Due to the block-diagonal structure of $\Lambda$ and $\Lambda_A$, the blocks $F(d)^{(i)}$, i=1, …, D, are of size K by 1 in F(d). They are determined by performing on the main diagonal blocks, $\Lambda^{(i)}$ of $\Lambda$, LU decomposition, $\Lambda^{(i)}=L^{(i)} U^{(i)}$, forward substitution, $L^{(i)} y^{(i)} = \Lambda_A^{(i)H} F(r_c)^{(i)}$, 55, and backward substitution, $U^{(i)}[F(d)]^{(i)} = y^{(i)}$, 56. $L^{(i)}$ is a lower triangular matrix. $U^{(i)}$ is an upper triangular matrix. $\Lambda_{(A)}^{(i)}$ is the $i^{th}$ main diagonal block of size SF by K in $\Lambda_A$ and $F(r_c)^{(i)}$ is the $i^{th}$ block of size Q×1 in $F(r_c)$. $\Lambda_A$ is the block DFT using PFA-FFT of the first column of $A_c$ and $F(r_c)$ is the block DFT using PFA-FFT of the vector, $r_c$. The estimated data vector, d, is determined by an inverse block-DFT of F(d), 57.

Although Equation 9 is a MMSE based solution, fast joint detection can be applied to other approaches, such as a zero forcing approach as per Equation 11.

$$Rd = (A^H A)d = A^H r \qquad \text{Equation 11}$$

As shown in Equation 11, in the zero forcing solution, the $\sigma^2 I$ term is deleted from Equation 8. The following is a derivation for the MMSE solution, although an analogous derivation can be used for a zero forcing solution.

To reduce the complexity in determining $F(A^H r)$, a block DFT using PFA-FFT approach taking advantage of the block-Toeplitz structure of A may be used as shown in Equation 2. First, by repeating B, we extend A to a block-square matrix of size D·Q×D·K, to use all of the chip symbols in the observation interval. The extended A is composed of $D^2$ blocks of size Q×K. The extended A is approximated to the block-circulant matrix $A_c$.

$A_c$ can be decomposed into three matrices per Equation 12.

$$A_c = F_{(Q)}^H \Lambda_A F_{(K)} \qquad \text{Equation 12}$$

$F_{(n)} = F \otimes I_n$ is a block DFT using PFA-FFT matrix of size D·n by D·n. $\otimes$ denotes a Kronecker product. $I_n$ is an identity matrix of size n×n and F is a DFT matrix of size D×D, whose elements $f_{il}$, i and l=1, 2, ..., D are per Equation 13.

$$f_{il} = \frac{1}{\sqrt{D}} \exp\left(-j\frac{2\pi i l}{D}\right) \qquad \text{Equation 13}$$

D is the length of the DFT and $F^H F = I$. I is an identity matrix of size D×D.

The block diagonal matrix $\Lambda_A$ is of size D·Q×D·K and has the form per Equation 14.

$$\Lambda_A = \begin{bmatrix} \Lambda_A^{(1)} & 0 & \cdots & 0 \\ 0 & \Lambda_A^{(2)} & \cdots & 0 \\ \vdots & \vdots & \ddots & \vdots \\ 0 & 0 & \cdots & \Lambda_A^{(D)} \end{bmatrix} \qquad \text{Equation 14}$$

Each of its entries $\Lambda_A^{(i)}$, i=1, 2, ... D, is a Q by K block per Equation 15.

$$\Lambda_A^{(i)} = \begin{bmatrix} \lambda_{1,1}^{(A,i)} & \cdots & \cdots & \lambda_{1,K}^{(A,i)} \\ \vdots & \ddots & & \vdots \\ \vdots & & \ddots & \vdots \\ \lambda_{Q,1}^{(A,i)} & \cdots & \cdots & \lambda_{Q,K}^{(A,i)} \end{bmatrix} \qquad \text{Equation 15}$$

Alternatively, the main diagonal blocks, $\Lambda_A^{(i)}$, i=1, 2, ... D, can be computed by, per Equation 16.

$$[\Lambda_A^{(1)T} \Lambda_A^{(2)T} \ldots \Lambda_A^{(D)T}]^T = (F_{(Q)} A_c(:,1:K)) \qquad \text{Equation 16}$$

$A_c(:,1:K)$ denotes the first block column of $A_c$. Namely, the first K columns of $A_c$. $F_{(SF)} A_c(:,1:K)$ can be calculated by Q·K parallel non-block DFTs of length D, using PFA-FFTs.

Due to the extension of A, the received vector r is also extended by inserting zeros, becoming vector $r_c$ of size D·Q by 1.

Using the above, $F(A^H r)$ is approximated to $F(A_c^H r_c)$. It can be written as Equation 17.

$$F(A_c^H r_c) = F_{(K)}^H \Lambda_A^H F_{(Q)} r_c \qquad \text{Equation 17}$$

The covariance matrix R of size $N_s \cdot K \times N_s \cdot K$ has the block-square matrix form shown in Equation 18.

$$R = \begin{bmatrix} R_0 & R_1^H & \cdots & R_L^H & \cdots & \cdots & \cdots & \cdots & 0 & \cdots & 0 & 0 \\ R_1 & R_0 & \ddots & \ddots & \ddots & \ddots & \ddots & \ddots & \ddots & \ddots & \vdots & \vdots \\ \vdots & R_1 & \ddots & \ddots & \ddots & \ddots & \ddots & \ddots & \ddots & \ddots & \vdots & \vdots \\ \vdots & \vdots & \ddots & \ddots & \ddots & \ddots & \ddots & \ddots & \ddots & \ddots & \vdots & \vdots \\ R_L & \vdots & \ddots & \ddots & \ddots & \ddots & \ddots & \ddots & \ddots & \ddots & \vdots & \vdots \\ 0 & R_L & \ddots & \ddots & \ddots & \ddots & \ddots & \ddots & \ddots & \ddots & \vdots & \vdots \\ \vdots & 0 & \ddots & R_L & \ddots & \ddots & \ddots & \ddots & \ddots & \ddots & 0 & \vdots \\ \vdots & \vdots & \ddots & \ddots & \ddots & \ddots & \ddots & \ddots & \ddots & \ddots & R_L^H & 0 \\ \vdots & \vdots & \ddots & \ddots & \ddots & \ddots & \ddots & \ddots & \ddots & \ddots & \vdots & R_L^H \\ \vdots & \vdots & \ddots & \ddots & \ddots & \ddots & \ddots & \ddots & \ddots & \ddots & \vdots & \vdots \\ 0 & 0 & \cdots & \cdots & \cdots & \cdots & \cdots & \cdots & R_L & \cdots & R_1 & R_0 \end{bmatrix} \quad \text{Equation 18}$$

L is defined per Equation 19.

$$L = \left\lceil \frac{Q+W-1}{Q} \right\rceil \qquad \text{Equation 19}$$

Each entry, $R_i$, in the R matrix is a K by K block and 0 is a K by K zero matrix. Due to the size of the extended A, the matrix R is also extended to size D·K by D·K by inserting zeros.

The extended R is approximated to a block-circulant matrix, $R_c$, of size D·K by D·K per Equation 20.

$$R_c = \qquad \text{Equation 20}$$

$$\begin{bmatrix} R_0 & R_1^H & \cdots & R_L^H & \cdots & \cdots & \cdots & \cdots & 0 & \cdots & R_2 & R_1 \\ R_1 & R_0 & \ddots & \ddots & \ddots & \ddots & \ddots & \ddots & \ddots & \ddots & \vdots & \vdots \\ \vdots & R_1 & \ddots & \ddots & \ddots & \ddots & \ddots & \ddots & \ddots & \ddots & R_L & \vdots \\ \vdots & \vdots & \ddots & \ddots & \ddots & \ddots & \ddots & \ddots & \ddots & \ddots & \vdots & R_L \\ R_L & \vdots & \ddots & \ddots & \ddots & \ddots & \ddots & \ddots & \ddots & \ddots & \vdots & \vdots \\ 0 & R_L & \ddots & \ddots & \ddots & \ddots & \ddots & \ddots & \ddots & \ddots & \vdots & \vdots \\ \vdots & 0 & \ddots & R_L & \ddots & \ddots & \ddots & \ddots & \ddots & \ddots & 0 & \vdots \\ \vdots & \vdots & \ddots & \ddots & \ddots & \ddots & \ddots & \ddots & \ddots & \ddots & R_L^H & 0 \\ R_L^H & \vdots & \ddots & \ddots & \ddots & \ddots & \ddots & \ddots & \ddots & \ddots & \vdots & R_L^H \\ \vdots & R_L^H & \ddots & \ddots & \ddots & \ddots & \ddots & \ddots & \ddots & \ddots & \vdots & \vdots \\ \vdots & \vdots & \ddots & \ddots & \ddots & \ddots & \ddots & \ddots & \ddots & \ddots & \vdots & \vdots \\ R_1^H & R_2^H & \cdots & \cdots & \cdots & \cdots & \cdots & \cdots & R_L & \cdots & R_1 & R_0 \end{bmatrix}$$

The block circulant matrix $R_c$, is decomposed into three matrices per Equation 21.

$$R_c = F_{(K)}^H \Lambda F_{(K)} \qquad \text{Equation 21}$$

$F_{(K)} = F \otimes I_K$ is a block DFT using PFA-FFT matrix of size $D \cdot K \times D \cdot K$. $\otimes$ denotes a Kronecker product. $I_K$ is an identity matrix of size $K \times K$ and $F$ is a DFT matrix of size $D \times D$ as described in Equation 13.

The block diagonal matrix $\Lambda$ of size $D \cdot K$ by $D \cdot K$ has the form per Equation 22.

$$\Lambda = \begin{bmatrix} \Lambda^{(1)} & 0 & \cdots & 0 \\ 0 & \Lambda^{(2)} & \cdots & 0 \\ \vdots & \vdots & \ddots & \vdots \\ 0 & 0 & \cdots & \Lambda^{(D)} \end{bmatrix} \qquad \text{Equation 22}$$

Each of its entries, $\Lambda^{(i)}$, $i=1, 2, \ldots, D$, is a K by K block, per Equation 23A.

$$\Lambda^{(i)} = \begin{bmatrix} \lambda_{1,1}^{(i)} & \cdots & \cdots & \lambda_{1,K}^{(i)} \\ \vdots & \ddots & & \vdots \\ \vdots & & \ddots & \vdots \\ \lambda_{K,1}^{(i)} & \cdots & \cdots & \lambda_{K,K}^{(i)} \end{bmatrix} \qquad \text{Equation 23A}$$

Alternatively, the main diagonal blocks, $\Lambda^{(i)}$, $i=1, 2, \ldots, D$, can be computed per Equation 23B.

$$[\Lambda^{(1)T} \Lambda^{(2)T} \ldots \Lambda^{(D)T}]^T = (F_{(K)} R_c(:,1:K)), \qquad \text{Equation 23B}$$

$R_c(:,1:K)$ denotes the first block column of $R_c$. Namely, the first K columns of $R_c$. $F_{(K)} R_c(:,1:K)$ can be calculated by $K^2$ parallel non-block DFTs of length D, using PFA-FFTs.

The estimated data vector, d, in Equation 7 is preferably approximated per Equation 24A.

$$d = R^{-1} A^H r \qquad \text{Equation 24A}$$
$$\approx R_c^{-1} A_c^H r_c$$
$$= F_{(K)}^H \Lambda^{-1} \Lambda_A^H F_{(Q)} r_c$$

The block diagonal matrix $\Lambda^{-1}$ is per Equation 24B.

$$\Lambda^{-1} = \begin{bmatrix} \Lambda^{(1)-1} & 0 & \cdots & 0 \\ 0 & \Lambda^{(2)-1} & \cdots & 0 \\ \vdots & \vdots & \ddots & \vdots \\ 0 & 0 & \cdots & \Lambda^{(D)-1} \end{bmatrix} \qquad \text{Equation 24B}$$

The inversion of $\Lambda$ requires an inversion of $K \times K$ matrices, $\Lambda^{(i)}$, $i=1, 2, \ldots, D$.

Equation 24A can be rewritten as Equation 25.

$$F(d) = \Lambda^{-1} \Lambda_A^H F(r_c) \qquad \text{Equation 25}$$

$F(r_c)$ is per Equations 26A and 26B.

$$F(r_c) = F_{(Q)} r_c \qquad \text{Equation 26A}$$

$$F(d_c) = F_{(K)} r_c \qquad \text{Equation 26B}$$

Due to the block-diagonal structure of $\Lambda^{-1}$ and $\Lambda_A^H$, Equation 25 can be efficiently calculated as follows. The terms of Equation 25 are partitioned into D blocks, as per Equation 27.

$$\begin{bmatrix} F(d)^{(1)} \\ F(d)^{(2)} \\ \vdots \\ F(d)^{(D)} \end{bmatrix} = \begin{bmatrix} \Lambda^{(1)-1} & & & \\ & \Lambda^{(2)-1} & & \\ & & \ddots & \\ & & & \Lambda^{(D)-1} \end{bmatrix} \begin{bmatrix} \Lambda_A^{(1)} & & & \\ & \Lambda_A^{(2)} & & \\ & & \ddots & \\ & & & \Lambda_A^{(D)} \end{bmatrix}^H \begin{bmatrix} F(r_c)^{(1)} \\ F(r_c)^{(2)} \\ \vdots \\ F(r_c)^{(D)} \end{bmatrix} \qquad \text{Equation 27}$$

Each block in Equation 27 is solved separately, per Equation 28.

$$F(d)^{(i)} = \Lambda^{(i)-1} \Lambda_A^H F(r_c)^{(i)} \qquad \text{Equation 28}$$

$F(d)^{(i)}$ is a K by 1 vector. $\Lambda^{(i)}$ is a K by K matrix, per Equation 22. $\Lambda_A^{(i)}$ is a Q by K matrix, per Equation 14. $F(r_c)^{(i)}$ is a Q by 1 vector and is composed of elements $(1+(i-1)Q)$ through $(i \cdot Q)$ of $F(r_c)$.

To avoid the direct inversion of $\Lambda^{(i)}$, Equation 28 can be solved by using LU decomposition and forward and backward substitution. Equation 28 is rewritten per Equation 29.

$$\Lambda^{(i)} F(d)^{(i)} = \Lambda_A^{(i)H} F(r_c)^{(i)} \qquad \text{Equation 29}$$

$\Lambda^{(i)}$ is decomposed per Equation 30.

$$\Lambda^{(i)} = L^{(i)} U^{(i)} \qquad \text{Equation 30}$$

$L^{(i)}$ is a lower triangular matrix and $U^{(i)}$ is an upper triangular matrix.

Using LU decomposition, Equation 28 is represented as, per Equation 31.

$$L^{(i)} U^{(i)} F(d)^{(i)} = \Lambda_A^{(i)H} F(r)^{(i)} \qquad \text{Equation 31}$$

$F(\underline{d})^{(i)}$ in Equation 31 is solved by forward substitution, per Equation 32, and backward substitution, per Equation 33.

Forward Substitution: $L^{(i)} y^{(i)} = \Lambda_A^{(i)H} F(r)^{(i)}$  Equation 32

Backward Substitution: $U^{(i)} [F(\underline{d})]^{(i)} = y^{(i)}$  Equation 33

Finally, d is determined for all blocks as per Equation 34.

$$\underline{d} = F^{-1}(\underline{d}) = F^{-1}\left(\begin{bmatrix} F(\underline{d})^{(1)} \\ F(\underline{d})^{(2)} \\ \vdots \\ F(\underline{d})^{(D)} \end{bmatrix}\right)$$  Equation 34

FIG. 6 is a block diagram of a preferred implementation of efficient joint detection in a TDD/CDMA system. Using the received vector, r, $r_c$ is formed by inserting zeros, then a block DFT 100 of $r_c$ is performed per Equation 26, to produce $F(r_c)$.

Using the received training sequences, the channel impulse responses for each transmitted burst, $h^{(k)}$, is determined by an estimate channel response block 102. Using each channelization code, $c^{(k)}$ and the channel impulse response, $h^{(k)}$, the system matrix, A, is determined by compute block matrix A block 104 per Equation 2.

To determine $\Lambda_A$, the system matrix A is extended by extend block 132, to use all received chips in the observation interval. The first block column of the block-circulant matrix $A_c$ is determined by selecting the first K columns of the extended A matrix by first block column block 114. By taking a block DFT using PFA-FFT 118 using PFA-FFT, $\Lambda_A$ is determined.

To determine $\Lambda$, R is first determined by compute R block 140. For an MMSE solution, $R = A^H A + \sigma^2 I$ is used; for a zero forcing solution, $R = A^H A$ is used. Due to the size of the extended A, R is also extended by extend block 134. The first block column of the extended R matrix is determined by selecting the first K columns of the extended R matrix by first block column block 108. The first block column of the extended R matrix is circularized by a circularize block column block 110. It becomes the first block column of a block-circulant $R_c$. By taking a block DFT using PFA-FFT by block DFT block 112, $\Lambda$ is determined.

To efficiently compute the estimated data vector d, $\Lambda_A$, $\Lambda$, and $F(r_c)$ are divided into blocks $\Lambda_A^{(i)}$, $\Lambda^{(i)}$, and $F(r_c)^{(i)}$, i=1, 2, ..., D, respectively, exploiting the block-diagonal structures of $\Lambda_A$ and $\Lambda$, by partition block 136. The complex conjugate transpose of $\Lambda_A^{(i)}$, $\Lambda_{(A)}^{(i)H}$, is determined by a transpose block 130. A multiplier 128 multiplies $\Lambda_A^{(i)H}$ by $F(r_c)^{(i)}$. $\Lambda^{(i)}$ is decomposed using LU decomposition by a LU decomposition block 126, per Equation 30. By performing forward and backward substitution, per Equations 31-33, using forward and backward substitution blocks 124 and 122, respectively, $F(\underline{d})^{(i)}$ is determined. By repeating the LU decomposition and forward and backward substitution D times, F(d) is found. Taking an inverse block DFT using PFA-FFT of F(d) by block inverse DFT block 120, d is estimated.

FIGS. 7, 8 and 9 are simplified diagrams of receivers applying efficient joint detection to multiple reception antennas and/or fractional (multiple chip rate) sampling. A receiver 28 with multiple reception antennas is shown in FIG. 7. Transmitted bursts are received by each antenna $40_1$ to $4_m$ (40). Each antennas' version of the received bursts are reduced to baseband, such as by demodulators $42_1$ to $42_m$. The baseband signals for each antenna are sampled by sampling devices $43_1$ to $43_m$ to produce a received vector, $r_1$ to $r_m$, for each antenna 40. The samples corresponding to the midamble are processed by a channel estimation device 144 to produce channel response matrices, $H_1$ to $H_m$, for each antenna 40. The received data vector, d, is determined by an efficient joint detection device 142 using the received vectors and the channel response matrices.

A receiver 28 sampling using fraction sampling is shown in FIG. 8. Transmitted bursts are received by the antenna 40. The received bursts are reduced to baseband, such as by a demodulator 42. The baseband signal is sampled by a sampling device 43 to produce factional samples as received vectors, $r_1$ to $r_m$. Each received vector represents chip rate samples sampled at a fraction of a chip offset. To illustrate, for twice the chip rate sampling, two received vectors $r_1$ and $r_2$ are produced. Each of those vectors has samples spaced by half a chip in time. Samples corresponding to the midamble are processed by a channel estimation device 144 to produce channel response matices, $H_1$ to $H_m$, for each set of fractional samples. The received data vector, d, is determined by an efficient joint detection device 142 using the received vectors and the channel response matrices.

A receiver 28 with multiple reception antennas and using fractional sampling is shown in FIG. 9. Transmitted bursts are received by each antenna $40_1$ to $40_i(40)$. Each antennas' version of the received bursts are reduced to baseband, such as by demodulators $42_1$ to $42_i$. The baseband signals for each antenna are sampled by sampling devices $43_1$ to $43_j$ to produce received vectors, $r_1$ to $r_m$. The received vectors for each antenna correspond to each multiple of the chip rate samples. The samples corresponding to the midamble are processed by a channel estimation device 144 to produce channel response matrices, $H_1$ to $H_m$, for each antenna's fractional samples. The received data vector, d, is determined by an efficient joint detection device 142 using the received vectors and the channel response matrices.

In applying efficient joint detection to either receive diversity, fractional sampling or both, the received communication bursts are viewed as M virtual chip rate received bursts. To illustrate, for twice the chip rate sampling and two antenna receive diversity, the received bursts are modeled as four (M=4) virtual chip rate received bursts.

Each received burst is a combination of K transmitted bursts. Each of the K transmitted bursts has its own code. The channel impulse response vector of the $k^{th}$ out of K codes and the $m^{th}$ out of the M virtual received bursts is $h^{(k,m)}$. $h^{(k,m)}$ has a length W and is estimated from the midamble samples of the burst of the $k^{th}$ code of the $m^{th}$ virtual received burst.

Each of the N data symbols of the burst of the $k^{th}$ code is per Equation 35.

$d^{(k)} = [d_1^{(k)} d_2^{(k)} \ldots d_N^{(k)}]^T, 1 \leq k \leq K$  Equation 35

The code of the $k^{th}$ burst is per Equation 36.

$c^{(k)} = [c_1^{(k)} c_2^{(k)} \ldots c_Q^{(k)}]^T, 1 \leq k \leq K$  Equation 36

The symbol response of the $k^{th}$ code's contribution to the $m^{th}$ virtual burst, $b^{(k,m)}$ is per Equation 37.

$b^{(k,m)} = h^{(k,m)} \otimes c^{(k)}$  Equation 37

The length of the symbol response is Q+W−1. Q is the spreading factor. The system matrix, $A^{(m)}$, for each $m^{th}$ received burst is per Equation 38.

$$A^{(m)} = \begin{bmatrix} B^{(m)} \updownarrow Q \\ \quad B^{(m)} \\ \quad \quad B^{(m)} \\ \quad \quad \quad \ddots \\ \quad \quad \quad \quad B^{(m)} \end{bmatrix} \quad \text{Equation 38}$$

Each block $B^{(m)}$ is of size (Q+W−1) by K and is per Equation 39.

$$B^{(m)} = [b^{(1,m)} b^{(2,m)} \ldots b^{(k,m)}] \quad \text{Equation 39}$$

The overall system matrix A is per Equation 40.

$$A = \begin{bmatrix} A^{(1)} \\ A^{(2)} \\ \vdots \\ A^{(M)} \end{bmatrix} \quad \text{Equation 40}$$

As shown in Equation 38, each sub-system matrix $A^{(m)}$ is block Toeplitz. The overall received vector of the M virtual bursts is of size M(NQ+W−1) and is per Equation 41.

$$r = [r_1^T r_2^T \ldots r_M^T]^T \quad \text{Equation 41}$$

The $m^{th}$ received vector $r_m$ is of size NQ+W−1 by 1.

Equation 42 is a model for the overall received vector.

$$r = Ad + n \quad \text{Equation 42}$$

n is the noise variance.

Each $m^{th}$ received virtual burst is per Equation 43.

$$r_m = A^{(m)} d + n_m \quad \text{Equation 43}$$

$n_m$ is the noise variance for the $m^{th}$ received virtual burst.

To solve for the data vector d in Equation 42, a block linear equalizer with either a zero forcing or minimum mean square error (MMSE) approach may be used per Equation 44.

$$d = R^{-1} A^H r \quad \text{Equation 44}$$

R is the covariance matrix.

For a zero forcing solution, R is per Equation 45.

$$R = \sum_{m=1}^{M} A^{(m)H} A^{(m)} = A^H A \quad \text{Equation 45}$$

For a MMSE solution, R is per Equation 46.

$$R = \sum_{m=1}^{M} A^{(m)H} A^{(m)} + \sigma^2 I = A^H A + \sigma^2 I \quad \text{Equation 46}$$

The covariance matrix for either the zero forcing or MMSE solution is a block Toeplitz. To apply a discrete Fourier transform to the block-Toeplitz $A^{(m)}$ matrix, a block-circulant approximation of $A^{(m)}$, $A_c^{(m)}$ is used. To make $A^{(m)}$ a block-square matrix, $A^{(m)}$ is extended. The extended $A^{(m)}$ matrix is then approximated to a block circulant matrix $A_c^{(m)}$.

The $A_c^{(m)}$ matrix is composed of D by D blocks. Each block is of size Q by K. Accordingly, the size of $A_c^{(m)}$ becomes DQ by DK. To include all the elements of $A^{(m)}$, D is chosen to be an integer larger than $D_{min}$ as determined per Equation 47.

$$D_{\min} = \left\lceil N + \frac{(W-1)}{Q} \right\rceil \quad \text{Equation 47}$$

$\lceil \cdot \rceil$ represents a round up to an integer function.

The covariance matrix R is a block-square matrix of size NK by NK with blocks of size K by K. For R to be compatible with the extended $A_c^{(m)}$ matrix, R is extended to the size DK by DK by zero-padding and approximating the extended R to a block circulant covariance matrix $R_c$. For the received vector, $r^{(m)}$, to be compatible with $A_c^{(m)}$ and $R_c$, $r^{(m)}$ is extended to a DQ by 1 vector, $r_c^{(m)}$ by zero padding.

After extending the received vectors, $r^{(m)}$, the overall received vector is per Equation 48.

$$r_c = [r_c^{(1)T} r_c^{(2)T} \ldots r_c^{(M)T}]^T \quad \text{Equation 48}$$

Each block-circulant matrix $A_c^{(m)}$ is diagonalized to a block-diagonal matrix by block discrete Fourier transform matrices per Equation 49.

$$A_c^{(m)} = F_{(Q)}^H \Lambda_A^{(m)} F_{(K)} \quad \text{Equation 49}$$

$F_{(Q)}$ is per Equation 50.

$$F_{(Q)} = F \otimes I_Q \quad \text{Equation 50}$$

$F_{(K)}$ is per Equation 51.

$$F_{(K)} = F \otimes I_K \quad \text{Equation 51}$$

F is a discrete Fourier transform matrix of size D by D and is an n by n identity matrix. $\Lambda_A^{(m)}$ is a block diagonal matrix of the form of Equation 52.

$$\Lambda_A^{(m)} = \begin{bmatrix} \Lambda_A^{(1,m)} & 0 & \cdots & 0 \\ 0 & \Lambda_A^{(2,m)} & \cdots & 0 \\ \vdots & \vdots & \ddots & \vdots \\ 0 & 0 & \cdots & \Lambda_A^{(D,m)} \end{bmatrix} \quad \text{Equation 52}$$

$\Lambda_A^{(l,m)}$ for l=1, ..., D, and m=1, ..., M is a non-zero block of size Q by K. 0 is a zero matrix of size Q by K having all zero elements.

$\Lambda_A^{(l,m)}$ is alternately computed per Equation 53.

$$\Lambda_A^{(m)} = \text{diag}^B(F_{(Q)} A_c^{(m)}(:,1:K)) \quad \text{Equation 53}$$

$A_c^{(m)}(:,1:K)$ is the first block column of $A_c^{(m)}$. The first block column having K columns. To determine $\Lambda_A^{(m)}$, preferably $F_{(Q)} A_c^{(m)}(:,1:K)$ is determined by QK parallel non-block DFTs of length D, using PFA-FFTs. The block circulant matrix $R_c$ is also preferably diagonalized to the block diagonal matrix $\Lambda_R$ by a block DFT matrix $F_{(K)} = F \otimes I_K$ as per Equation 54.

$$R_c = F_{(K)}^H \Lambda_R F_{(K)} \quad \text{Equation 54}$$

The block diagonal matrix $\Lambda_R$ is composed by blocks $\Lambda_R^{(l)}$, l=1, ..., D of size K by K in its main diagonal block, per Equation 55.

$$\Lambda_R = \begin{bmatrix} \Lambda_R^{(1)} & 0 & \cdots & 0 \\ 0 & \Lambda_R^{(2)} & \cdots & 0 \\ \vdots & \vdots & \ddots & \vdots \\ 0 & 0 & \cdots & \Lambda_R^{(D)} \end{bmatrix} \quad \text{Equation 55}$$

Another approach to determine $\Lambda_R$ is per Equation 56.

$$\Lambda_R = \text{diag}^B(F_{(K)}R_c(:,1:K)) \quad \text{Equation 56}$$

$R_c(:,1:K)$ is the first block column of $R_c$. $F_{(K)} R_c(:,1:K)$ is preferably determined using $K^2$ parallel non-block DFTs of length D. In one implementation, the $K^2$ parallel non-block DFTs are implemented using $K^2$ parallel non-block prime factor algorithm fast Fourier transforms (PFA-FFTs) of length D.

Preferably to perform the block equalization of Equation 44, the matched filtering is approximated per Equation 57.

$$A^H \underline{r} \approx A_c^H \underline{r}_c = \sum_{m=1}^M A^{(m)H} \underline{r}_c^{(m)} \quad \text{Equation 57}$$
$$= \sum_{m=1}^M (F_{(Q)}^H \Lambda_A^{(m)} F_{(K)})^H \underline{r}_c^{(m)}$$
$$= F_{(K)}^H \sum_{m=1}^M \Lambda_A^{(m)H} F_{(Q)} \underline{r}_c^{(m)}$$

The block-diagonalization of $A_c^{(m)}$ is per Equation 58.

$$A_c = [A_c^{(1)T} A_c^{(2)T} \ldots A_c^{(M)T}]^T \quad \text{Equation 58}$$

The estimation of the data vector, $\hat{d}$, is per Equation 59.

$$\hat{\underline{d}} = R^{-1} A^H \underline{r} \approx R_c^{-1} A_c^H \underline{r}_c \quad \text{Equation 59}$$
$$= (F_{(K)}^H \Lambda_R F_{(K)})^{-1} F_{(K)}^H \sum_{m=1}^M \left(\Lambda_A^{(m)H} F_{(Q)} \underline{r}_c^{(m)}\right)$$
$$= F_{(K)}^H \Lambda_R^{-1} F_{(K)} F_{(K)}^H \sum_{m=1}^M \left(\Lambda_A^{(m)H} F_{(Q)} \underline{r}_c^{(m)}\right)$$
$$= F_{(K)}^H \Lambda_R^{-1} \sum_{m=1}^M \left(\Lambda_A^{(m)H} F_{(Q)} \underline{r}_c^{(m)}\right)$$
$$= F_{(K)}^H \underline{y}$$

The vector $y$ is of size DK by 1 and is per Equation 60.

$$\underline{y} = \Lambda_R^{-1} \sum_{m=1}^M (\Lambda_A^{(m)H} F_{(Q)} \underline{r}_c^{(m)}) \quad \text{Equation 60}$$
$$= [\underline{y}^{(1)T} \underline{y}^{(2)T} \ldots \underline{y}^{(D)T}]^T$$

$\underline{y}^{(l)}$, $l=1, \ldots D$ is a vector of size K by 1.

Preferably to determine y, $F_{(Q)} \underline{r}_c^{(m)}$ is determined using Q parallel non-block DFTs of a length D. In one implementation, the Q parallel non-block DFTs are implemented using Q parallel non-block PFA-FFTs of length D. $\Lambda_R^{-1}$ is a block diagonal matrix having blocks of size K by K in the main diagonal and is per Equation 61.

$$\Lambda_R^{-1} = \begin{bmatrix} \Lambda_R^{(1)-1} & 0 & \cdots & 0 \\ 0 & \Lambda_R^{(2)-1} & \cdots & 0 \\ \vdots & \vdots & \ddots & \vdots \\ 0 & 0 & \cdots & \Lambda_R^{(D)-1} \end{bmatrix} \quad \text{Equation 61}$$

Each $\Lambda_R^{(l)-1}$, $l=1, \ldots, D$, is a block of size K by K.

Preferably using the block diagonal structure of $\Lambda_R^{-1}$, $\underline{y}^{(l)}$ is determined by the Cholesky decomposition of $\Lambda_R^{(l)}$ and forward and backward substitution in parallel. Alternately, $\Lambda_R^{(l)}$ is directly inverted.

To perform the Cholesky decomposition, a vector $$\sum_{m=1}^M \left(\Lambda_A^{(m)H} F_{(Q)} \underline{r}_c^{(m)}\right)$$

is divided into D blocks of a size K by 1, per Equation 62.

$$x = \sum_{m=1}^M \left(\Lambda_A^{(m)H} F_{(Q)} \underline{r}_c^{(m)}\right) \quad \text{Equation 62}$$
$$= [\underline{x}^{(1)T} \underline{x}^{(2)T} \ldots \underline{x}^{(D)T}]^T$$

A Cholesky factor $G^{(l)}$ of $\Lambda_R^{(l)}$ is determined using a factorization, per Equation 63.

$$\Lambda_R^{(l)} = G^{(l)} G^{(l)H} \quad \text{Equation 63}$$

Using the Cholesky factor $G^{(l)}$, each $\underline{y}^{(l)}$ is determined by forward and backward substitution separately per Equations 64, 65 and 66.

$$\Lambda_R^{(l)} \underline{y}^{(l)} = G^{(l)} G^{(l)H} \underline{y}^{(l)} = \underline{x}^{(l)} \quad \text{Equation 64}$$

Forward Substitution: Find $\underline{z}^{(l)}$ in $G^{(l)} \underline{z}^{(l)} = \underline{x}^{(l)}$, where
$$\underline{z}^{(l)} = G^{(l)H} \underline{y}^{(l)} \quad \text{Equation 65}$$

Backward Substitution: Find $\underline{y}^{(l)}$ in $\underline{z}^{(l)} = G^{(l)H} \underline{y}^{(l)}$ \quad Equation 66

By performing a block inverse DFT of y, the data vector d is estimated as $\hat{d}$. Preferably, the block inverse DFT is implemented using K parallel non-block inverse PFA-FFTs of a length D.

FIG. 10 is a block diagram of a preferred implementation of efficient joint detection in a TDD/CDMA system. Although FIG. 10 illustrates using two sets of samples, the figure can be extended to other multiple sets. Using the received vector for each set of chip rate samples, $r_1$ and $r_2$, $r_c^{(l)}$ and $r_c^{(2)}$ is formed by inserting zeros, by Extend blocks $232_1$ and $232_2$, respectively. A block DFT $200_1$ and $200_2$ using PFA-FFT of $r_c^{(1)}$ and $r_c^{(2)}$ is then performed, to produce $F_{(Q)} r_c^{(1)}$ and $F_{(Q)} r_c^{(2)}$.

Using the received training sequences, the channel impulse responses for each chip rate version of each transmitted burst, $h^{(k)(1)}$ and $h^{(k)(2)}$, is determined by estimate channel response blocks $202_1$ and $202_2$. Using each channelization code, $c^{(k)}$ and the channel impulse response, $h^{(k)(1)}$ and $h^{(k)(2)}$, each system matrix, $A^{(1)}$ and $A^{(2)}$, is determined by compute subsystem matrix blocks $204_1$ and $204_2$ per Equations 37 and 38.

To determine $\Lambda_A^{(1)}$ and $\Lambda_A^{(2)}$, each system matrix, $A^{(1)}$ and $A^{(2)}$, is extended by extend blocks $231_1$ and $231_2$. The first block column of each block-circulant matrix, $A^{(1)}$ and $A^{(2)}$, is determined by selecting the first K columns of the extended $A^{(m)}$ matrix by first block column blocks $214_1$ and $214_2$. By taking block DFTs $218_1$ and $218_2$, $\Lambda_A^{(1)}$ and $\Lambda_A^{(2)}$ are determined using a PFA-FFT.

To determine $\Lambda_R$, the first block column of R is determined by compute first block column R block 240. The first column of R is extended by extend block 234. The first block column of the extended R is determined by a first block column determining device 208. The first block column of the extended R matrix is circularized, $R_c$, by a circularize block column block 210. By taking a block DFT by block DFT block 212, $\Lambda_R^{(\ )}$ is determined using a PFA-FFT.

To efficiently compute the estimated data vector d, each of $\Lambda_A^{(1)}$, $\Lambda_A^{(2)}$ and $F(r_c^{(1)})$ and $F(r_c^{(2)})$ as well as $\Lambda_R$ are used. Each of $F(r_c^{(1)})$, $F(r_c^{(2)})$, $\Lambda_A^{(1)}$, $\Lambda_A^{(2)}$, and $\Lambda_R$ is divided into D blocks, by partition block 236. The complex conjugate transpose of each of $\Lambda_A^{(1,i)}$ and $\Lambda_A^{(2,i)}$, $\Lambda_A^{(1,i)^H}$ and $\Lambda_A^{(2,i)^H}$, where i is the $i^{th}$ block, is determined by transpose blocks 230, 231. A multiplier 228 multiplies $\Lambda_A^{(2,i)^H}$ by $F_{(Q)}(r_c^{(2)})^{(i)}$. A multiplier 229 multiplies $\Lambda_A^{(1,i)^H}$ by $F_{(Q)}(r_c^{(1)})^{(i)}$. A summer 225 sums the multiplied results per Equation 62. $\Lambda_R^{(i)}$ is decomposed using Cholesky decomposition 226, per Equation 63. By performing forward and backward substitution, per Equations 65 and 66, using forward and backward substitution blocks 224 and 222, respectively, F(d) is determined. Taking an inverse block DFT using PFA-FFT of F(d) by block inverse DFT block 220 using a PFA-FFT, $\hat{d}$ is estimated.

What is claimed is:

1. An apparatus for solving a linear equation of the form r=A d+n for d using either a minimum mean square error block linear equalizer (MMSE-BLE) or zero forcing block linear equalizer (ZF-BLE) based solution, where A is a block Toeplitz matrix and n represents a noise vector, r and d are vectors, the apparatus comprising:
   a covariance matrix processing component configured to produce a covariance matrix R of the form $A^H A+\sigma^2 I$ for a MMSE-BLE based solution, where $A^H$ is a Hermetian of A, $\sigma^2$ is a noise variance and I is an identity matrix or $A^H A$ for a ZF-BLE based solution;
   a first matrix extension component configured to extend the A matrix and R matrix;
   a matrix block processing component configured to approximate the extended A and R matrices as block circulant matrices;
   a diagonal matrix processing component configured to determine a diagonal matrix of each of the extended and approximated A and R matrices, using the block columns of the extended and approximated A and R matrices;
   a second matrix extension component configured to extend r;
   a block Fourier transform component configured to take a Fourier transform of r;
   a multiplier component configured to take products of the diagonal matrices and the extended r;
   a summer configured to sum the products; and
   a block inverse Fourier transform component configured to estimate d using an inverse Fourier transform and the summed products.

2. The apparatus of claim 1 wherein the first and second matrix extension components are configured to respectively extend the A and R matrices and r to be compatible with a prime factor algorithm fast Fourier transform.

3. The apparatus of claim 1 further comprising a LU decomposition component configured to perform LU decomposition on the diagonal of the R matrix and; a forward substitution component and a backward substitution component configured to produce an inverse Fourier transform of d.

4. The apparatus of claim 1 further comprising a Cholesky decomposition component for performing Cholesky decomposition on the diagonal of the R matrix and a forward substitution component and a backward substitution component for producing an inverse Fourier transform of d.

5. A method for detecting data from K data signals transmitted over a shared spectrum in a code division multiple access format wherein a combined signal over the shared spectrum that includes the K transmitted data signals is received and sampled to produce a received vector, a system matrix and an associated covariance matrix using codes and estimated impulse responses of the K data signals is produced, the covariance matrix is extended and approximated as a block circulant matrix, a diagonal matrix of the extended and approximated covariance matrix is determined using a block column of the extended and approximated covariance matrix, the received vector is extended and a Fourier transform thereof is taken, the method comprising:
   conducting sampling to produce a plurality of received vector versions;
   for each vector version, producing a system matrix version using codes and estimated impulse responses of the K data signals and determining for each system matrix version a respective diagonal matrix version based on an extended and approximated block circulant version of the respective system matrix version;
   producing the system matrix by combining the system matrix versions produced with respect to the plurality of received vector versions from which the covariance matrix is produced;
   extending each received vector version and taking a Fourier transform of each;
   producing a plurality of products such that, for each of the received vector versions, a product is taken of:
   the Fourier transform of the extended received vector version,
   the diagonal matrix derived from the covariance matrix, and
   the received vector version's respective diagonal matrix version;
   summing the plurality of products; and
   estimating data of the K data signals using an inverse Fourier transform of the summed products.

6. The method of claim 5 wherein the Fourier transforms are performed using a prime factor algorithm fast Fourier transform.

7. The method of claim 5 wherein each received vector version corresponds to a different reception antenna.

8. The method of claim 5 wherein the combined signal is sampled at a multiple of a chip rate of the K data signals and each received vector version corresponds to a different chip rate multiple.

9. The method of claim 5 further comprising partitioning the diagonal matrices into a plurality of partitions.

10. The method of claim 5 wherein the estimating data of the K data signals includes performing LU decomposition, forward substitution and backward substitution.

11. The method of claim 5 wherein the estimating data of the K data signals includes performing Cholesky decomposition, forward substitution and backward substitution.

12. A communication station configured to detect data from K data signals transmitted over a shared spectrum in a code division multiple access format having a sampling component configured to sample a received combined signal over the shared spectrum that includes the K transmitted data signals to produce a received vector, a compute sub-system matrix component configured to produce a system matrix, a compute covariance matrix component configured to produce an associated covariance matrix using codes and estimated impulse responses of the K data signals, an extension component configured to extend the covariance matrix and a block column component configured to approximated the extended covariance matrix as a block circulant matrix, a block Fourier transform component configured to determine a diagonal matrix of the extended and approximated covariance matrix using a block column of the extended and approximated covariance matrix, the extension component configured to extend the received vector and the block Fourier transform component configured to take a Fourier transform thereof, the communication station wherein:

the sampling component is configured to produce a plurality of received vector versions;

the compute sub-system matrix component is configured to produce a system matrix version for each vector version using codes and estimated impulse responses of the K data signals and to combine the system matrix versions;

the block Fourier transform component is configured to determine a respective diagonal matrix version for each vector version based on an extended and approximated block circulant version of the respective system matrix version;

the extension component is configured to extend each received vector version and the block Fourier transform component is configured to take a Fourier transform of each extended received vector version; and comprising a multiplier component configured to take products such that, for each of the received vector versions, a product is taken of:

the Fourier transform of the extended received vector version, the diagonal matrix derived from the covariance matrix and the received vector version's respective diagonal matrix version;

a summer configured to sum the plurality of products; and a block inverse Fourier transform component configured to estimate data of the K data signals using an inverse Fourier transform of the summed products.

13. The communication station of claim 12 wherein the block Fourier transform component is configured to perform Fourier transforms using a prime factor algorithm fast Fourier transform.

14. The communication station of claim 12 further comprising a plurality of antennas associated with the sampling component such that each received vector version corresponds to a different reception antenna.

15. The communication station of claim 12 wherein the sampling component is configured such that the combined signal is sampled at a multiple of a chip rate of the K data signals and each received vector version corresponds to a different chip rate multiple.

16. The communication station of claim 12 further comprising a partitioning component configured to partition the diagonal matrix versions into a plurality of partitions.

17. The communication station of claim 12 wherein the block inverse Fourier transform component is configured to estimate data of the K data signals by performing LU decomposition, forward substitution and backward substitution.

18. The communication station of claim 12 wherein the block inverse Fourier transform component is configured to estimate data of the K data signals by performing Cholesky decomposition, forward substitution and backward substitution.

19. The communication station of claim 12 configured as a base station.

20. The communication station of claim 12 configured as a user equipment.

* * * * *